United States Patent [19]
Hasegawa et al.

[11] Patent Number: 4,813,861
[45] Date of Patent: Mar. 21, 1989

[54] TIRE VULCANIZING MACHINE

[75] Inventors: Akira Hasegawa; Katsuyoshi Sakaguchi, both of Nagasaki, Japan

[73] Assignee: Mitsubishi Jukogyo Kabushiki Kaisha, Tokyo, Japan

[21] Appl. No.: 141,267

[22] Filed: Jan. 6, 1988

[30] Foreign Application Priority Data

Jan. 7, 1987 [JP] Japan ................................ 62-560

[51] Int. Cl.⁴ ............................................. B29C 35/02
[52] U.S. Cl. ................................... 425/28.1; 425/47
[58] Field of Search ............... 425/28.1, 32, 47, 34.1, 425/451.9; 264/326; 156/96, 909, 95

[56] References Cited

U.S. PATENT DOCUMENTS

| 1,495,009 | 5/1924 | Fletcher et al. | 425/28.1 |
| 1,899,211 | 2/1933 | Shook | 425/47 |
| 3,878,023 | 4/1975 | Dexter | 425/28.1 X |
| 3,918,861 | 11/1975 | Klose | 425/47 |
| 4,013,390 | 3/1977 | Moeller et al. | 425/47 |
| 4,124,337 | 11/1978 | Martin | 425/47 X |
| 4,383,808 | 5/1983 | Kubo et al. | 425/32 X |
| 4,563,139 | 1/1986 | Yokoyama et al. | 425/32 X |

FOREIGN PATENT DOCUMENTS

| 203535 | 12/1982 | Japan | 425/47 |
| 138432 | 8/1984 | Japan | 425/47 |

Primary Examiner—Richard L. Chiesa
Attorney, Agent, or Firm—Bernard, Rothwell & Brown

[57] ABSTRACT

A breach lock mechanism in a tire vulcanizing machine for clamping upper and lower metal molds under pressure is improved so as to reduce a number or parts, simplify a structure and lower a cost. The tire vulcanizing machine comprises a lower metal mold supported on a base, an upper metal mold supported from a bolster and adapted to be placed on the lower metal mold, an upper ring rotatably fitted around an outer circumferential portion of the bolster and having claws at its lower end, a lower ring supported from the base in a vertically movable manner and having claws at its upper end, first drive means for rotating the upper ring, and second drive means for vertically moving the lower ring. The claws of the upper ring and the claws of the upper ring are adapted to be engaged with or disengaged from each other as a result of rotation of the upper ring, and the upper and lower metal molds are pressurized by lowering the lower ring when the claws of the upper ring and the claws of the lower ring are engaged with each other. Preferably, either or both of the claws of the upper ring and the claws of the lower ring are formed at a plurality of levels so that the engaging position between the upper and lower rings can be adjusted depending upon a total height of the upper and lower metal molds.

2 Claims, 6 Drawing Sheets

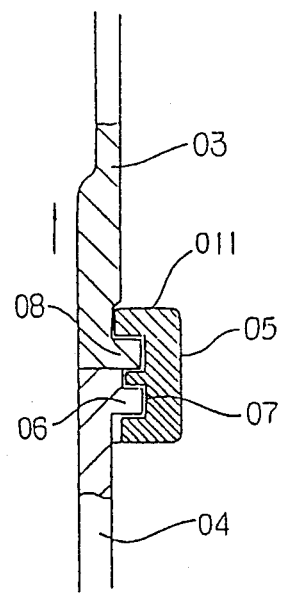
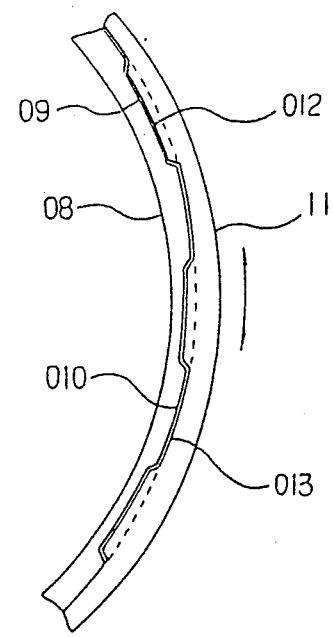
FIG. 6
PRIOR ART
FIG. 7
PRIOR ART

TIRE VULCANIZING MACHINE

BACKGROUND OF THE INVENTION

1. Field of the Invention

The present invention relates to a tire vulcanizing machine, and more particularly to a breach lock mechanism in a tire vulcanizing machine.

2. Description of the Prior Art

One example of tire vulcanizing machines in the prior art is shown in FIGS. 5 to 7. In FIG. 5, an upper mold 01 and a lower mold 02 are pressurized via an upper ring 03, a lower ring 04 and an intermediate lock ring 05. The intermediate ring 05 consists of two half rings integrated by means of assembling bolts and its vertical cross-section is of E-shape as shown in FIGS. 6 and 7. An annular projection at the top end of the lower ring 04 is slidably fitted in an annular groove 07 in the intermediate lock ring 03. A lower edge 08 of the upper ring 03 is provided with notches 09 and teeth 010, and an upper edge 011 of the intermediate lock ring 05 is provided with corresponding teeth 012 and notches 013.

Accordingly, by rotating the intermediate lock ring 05 (in the direction of arrows in FIG. 7) the upper ring 03 and the lower ring 04 can be separated (in the direction of an arrow in FIG. 6) or jointed.

It is to be noted that with regard to a mold clamping device in a tire vulcanizing machine of the above-mentioned type, Japanese patent application was filed and laid open as Laid-Open Japanese Patent Specification No. 59-138432 (1984).

According to the prior art as described above, the jointing means between the upper mold 01 and the lower mold 02 consists of four pieces of an upper ring 03, a lower ring 04 and an intermediate ring 05 (divided into two halves).

Accordingly, as a result of the large number of the jointing pieces, the structure becomes complexed and a cost is raised.

Moreover, in the prior art, since a pressurizing force is applied to a central portion of an upper metal mold, during a pre-pressurizing period before vulcanization, all the pressurizing force is received by the metal mold and the metal mold bears against its reaction force at its outer circumference. Hence, bending stress in a flat plate portion of the metal mold becomes large, and so, there exists a problem that it is necessary to use a metal mold having a mechanical strength higher than that necessitated for real vulcanization.

SUMMARY OF THE INVENTION

It is therefore one object of the present invention to provide a novel tire vulcanizing machine in which a number of parts of the device for clamping an upper mold and a lower mold under pressure is reduced, hence the structure of the device becomes simple and a cost of the device is reduced.

Another object of the present invention is to provide a novel tire vulcanizing machine in which an upper mold is not necessitated to have a mechanical strength higher than that necessitated for real vulcanization.

According to one feature of the present invention, a number of parts of the device for clamping an upper mold and a lower mold under pressure is reduced by providing claws on a lower ring, rotating an upper ring and thereby making the claws of the upper ring engage with the claws of the lower ring, in contrast to the fact that in the prior art an intermediate ring is rotatably mounted to a lower ring and claws provided on an intermediate ring are engaged with claws provided on an upper ring.

According to a more specific feature of the present invention, there is provided a tire vulcanizing machine comprising a lower metal mold supported on a base, an upper metal mold supported from a bolster and adapted to be placed on the lower metal mold, an upper ring rotatably fitted around an outer circumferential portion of the bolster and having claws at its lower end, a lower ring supported from the base in a vertically movable manner and having claws at its upper end, first drive means for rotating the upper ring, and second drive means for vertically moving the lower ring, the claws of the upper ring and the claws of the lower ring being adapted to be engaged with or disengaged from each other as a result of rotation of the upper ring, and the upper and lower metal molds being pressurized by lowering the lower ring when the claws of the upper ring and the claws of the lower ring are engaged with each other.

According to another more specific feature of the present invention, there is provided the above-featured tire vulcanizing machine wherein at least one of the claws of the upper ring and the claws of the lower ring are formed at multiple levels so that the engaging position between the upper ring and the lower ring can be adjusted in correspondence to a total height of the upper and lower metal molds.

In operation, owing to the above-described construction, under the condition where the claws of the upper ring and the claws of the lower ring are engaged with each other, a pressurizing force necessitated for vulcanization is applied to the upper and lower molds via the upper and lower rings. After completion of the vulcanization, the upper and lower molds can be opened by rotating the upper ring and thereby disengaging the claws of the upper and lower rings from each other.

According to the present invention, a number of parts of the device for clamping the upper and lower molds under pressure can be reduced, and hence it becomes possible to reduce the cost of the device.

In addition, since the circumferential portion of the upper mold is supported via the upper and lower rings, a mechanical strength necessitated for the upper mold can be made small.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS:

In the accompanying drawings:

FIG. 6 is an enlarged partial cross-section view of the portion of an intermediate lock ring in FIG. 5; and FIG. 7 is a plan view of the portion of the intermediate lock ring shown in FIG. 6.

DESCRIPTION OF THE PREFERRED EMBODIMENTS

Figure 1:
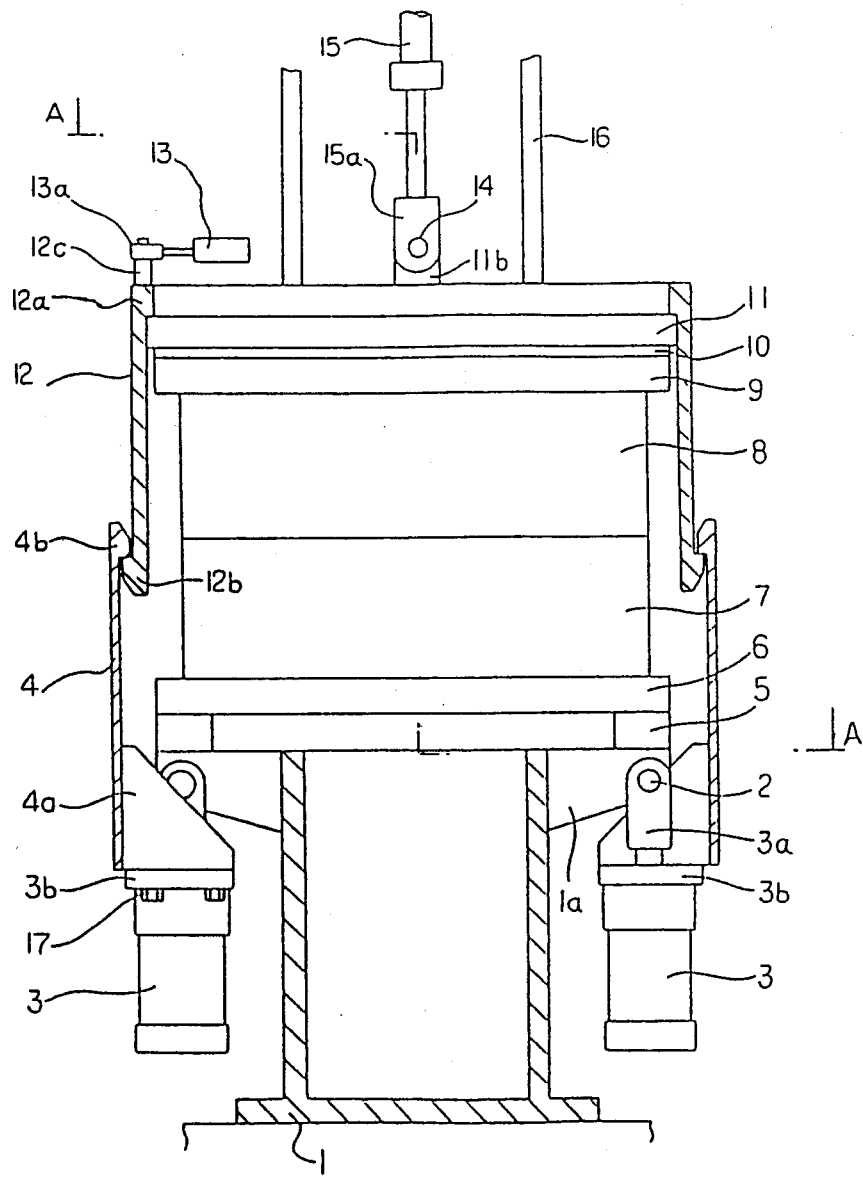
FIG. 1 is a cross-section side view of a tire vulcanizing machine according to a first preferred embodiment of the present invention under a vulcanizing condition.
Figure 2:
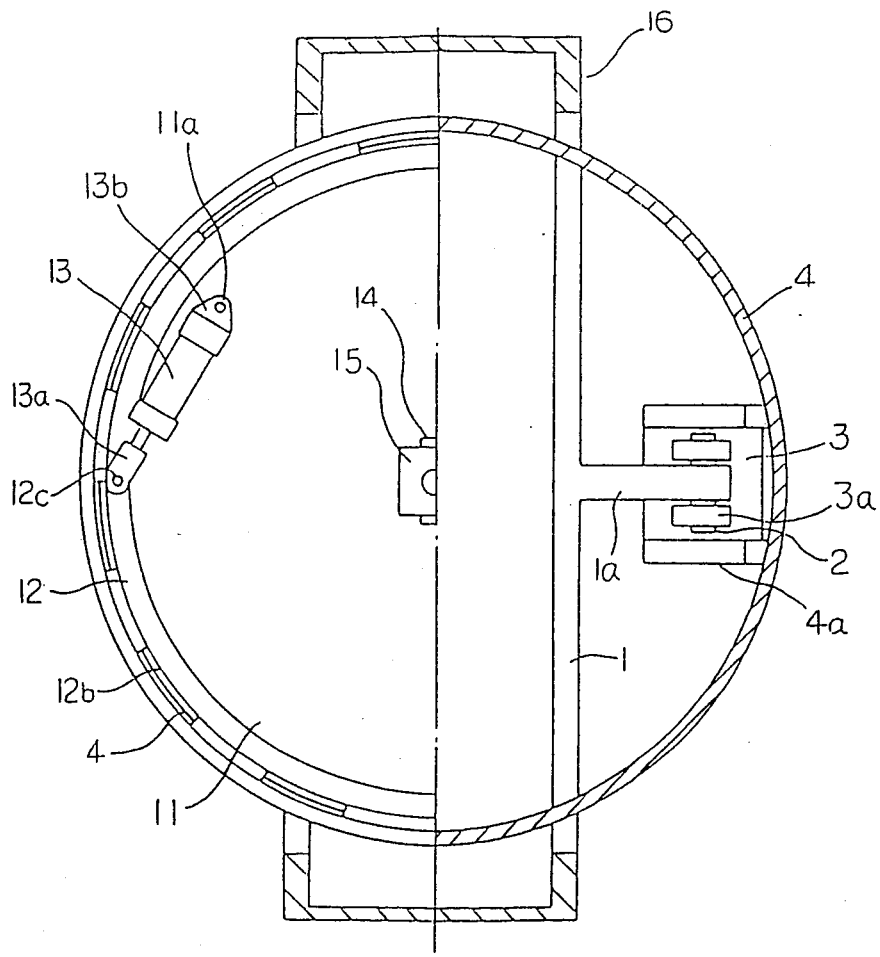
FIG. 2 is a cross-section plan view of the same machine taken along line A—A in FIG. 1 as viewed in the direction of arrows.

A principal portion of a tire vulcanizing machine according to a first preferred embodiment of the present invention is shown in FIGS. 1 and 2 as a cross-section side view and a cross-section plan view, respectively.

Ears 1a are provided on a base 1 integrally therewith, and a clevis 3a at the tip end of a piston rod of a hydraulic cylinder 3 is coupled via a pin 2 to a hole drilled in the ear 1a. A flange 3b of the hydraulic cylinder 3 is fixedly secured by means of bolts 17 to a rib 4a provided on the inside of a lower portion of a lower ring 4. The lower ring 4 has a cylindrical shape, and claws 4b are provided on the inside of an upper portion of the lower ring 4. On the top surface of the base 1 are fixedly secured a lower heat-insulating plate 5, a lower heater plate 6 and a lower metal mold 7 in succession towards the above by means of bolts not shown. On the top surface of an upper metal mold 8 are fixedly secured an upper heater plate 9, an upper heat insulating plate 10 and a bolster 11 in succession by means of bolts not shown.

The bolster 11 is of a disc shape having a step along its outer circumference, and a step 12a formed on the inside of an upper portion of an upper ring 12 is rotatably and loosely fitted in the step of the bolster 11. On the outside of a lower portion of the upper ring 12 of a clylindrical shape are provided claws 12b, and these claws 12b are engaged with the claws 4b of the lower ring 4 in a disengageable manner. A pin 12c is projected from the top surface of the upper ring 12, and a clevis 13a at the tip end of a piston rod of a hydraulic cylinder 13 is loosely fitted around the pin 12c. On the other hand, a clevis 13b at the rear end of a hydraulic cylinder 13 is loosely fitted around a rod 11a projected from the top surface of the bolster 11. At the center of the top surface of the bolster 11 is projected an ear 11b, and a clevis 15a at the tip end of a piston rod of a hydraulic cylinder 15 is coupled via a pin 14 to a hole drilled in the ear 11b.

A frame 16 is integrally fixed to the base 1, and the hydraulic cylinder 15 is fixed to an upper portion of the frame 16.

In the above-described apparatus, under the condition where the claws 12b and 4b of the upper and lower rings 12 and 4, respectively are meshed with each other, the hydraulic cylinders 3 are elongated by the action of a hydraulic pressure not shown, an thereby a tire is vulcanized with a predetermined pressurizing force. When the vulcanization has been finished, the hydraulic cylinders 3 are shortened, the hydraulic cylinder 13 is elongated, the positional relationship between the claws 12b of the upper ring 12 and the claws 4b of the lower ring 4 is brought to a disengaged condition, and the hydraulic cylinder 15 is shortened. Then, the gap space between the upper metal mold 7 and the lower metal mold 8 is opened, and so, the vulcanized tire can be ejected by means of a tire ejecting device not shown.

Now description will be made on a second preferred embodiment of the present invention illustrated in FIGS. 3 and 4. Except for the claws 4b and 12b in FIG. 1, the second preferred embodiment is similar to the above described first preferred embodiment.

Figure 3:
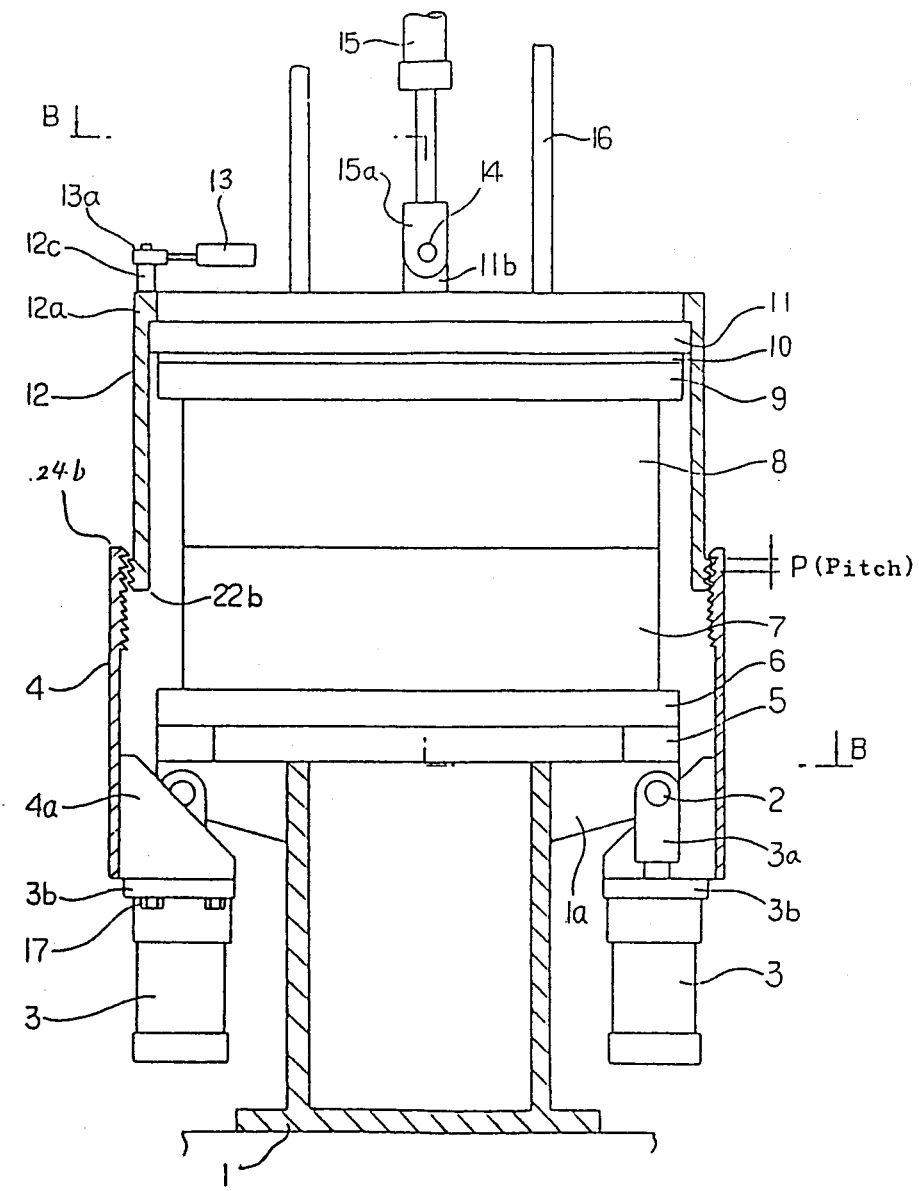
FIG. 3 is a cross-section side view of a tire vulcanizing machine according to a second preferred embodiment of the present invention under a vulcanizing condition.
Figure 4:
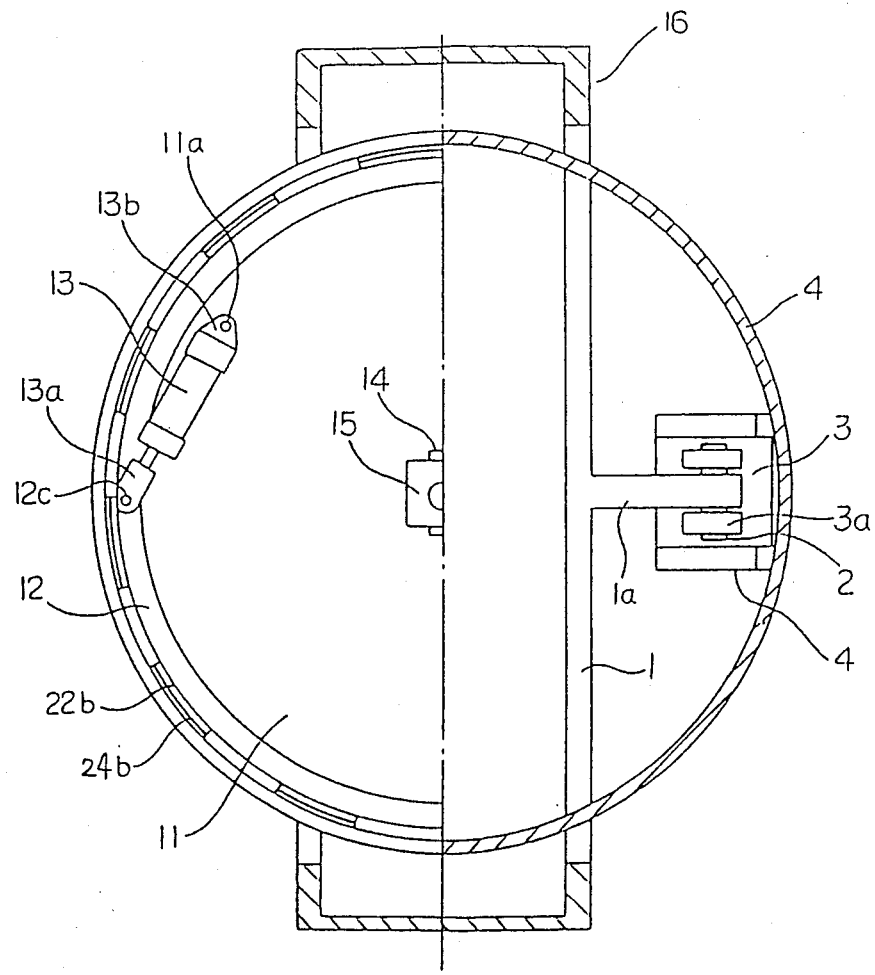
FIG. 4 is a cross-section plan view of the same machine taken along line B—B in FIG. 3 as viewed in the direction of arrows.
Figure 5:
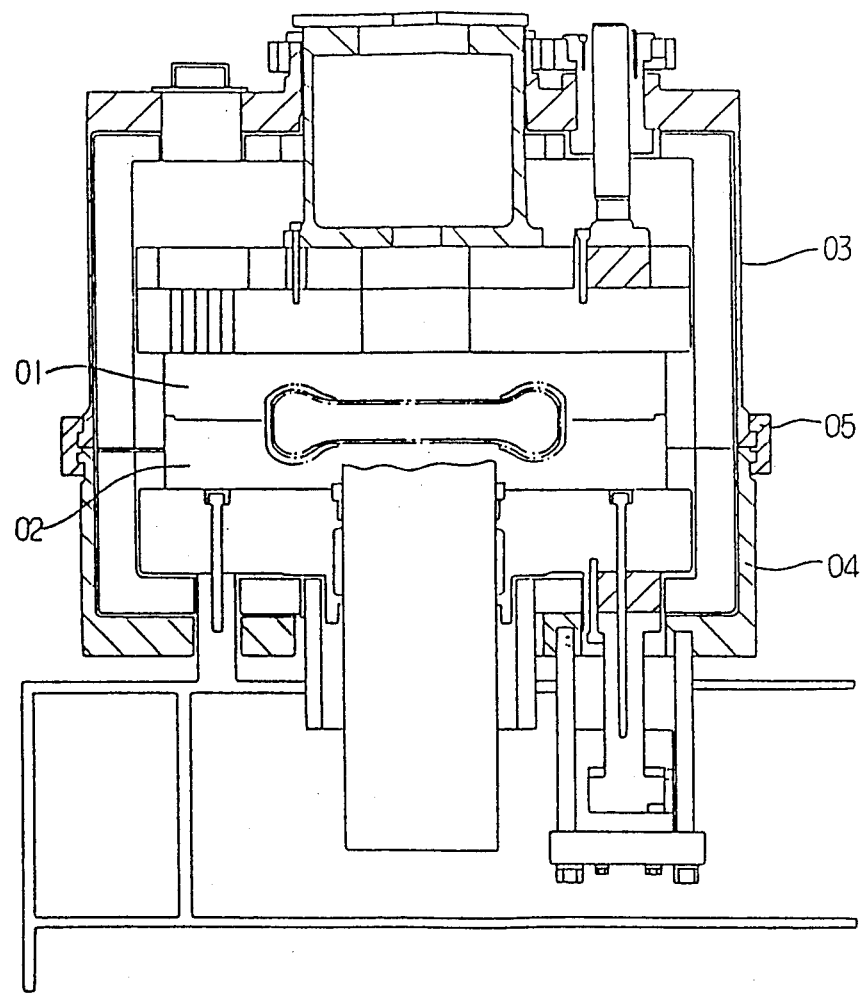
FIG. 5 is a cross-section side view of a tire vulcanizing machine in the prior art under a vulcanizing condition.

In FIGS. 3 and 4, on the outside of a lower portion of an upper ring 12 are provided claws 22b at a plurality of levels, and on the inside of an upper portion of a lower ring 4 are provided claws 24b at a plurality of levels.

The respective claws 22b and 24b on the upper and lower rings 12 and 4, respectively, are arrayed along a circumferential direction of these rings similarly to the claws 12b and 4b in the first preferred embodiment, and engagement and disengagement therebetween are carried out in a similar manner to the first preferred embodiment.

If an upper metal mold 8 and a lower metal mold 7 having a different total height of the upper and lower metal molds are employed, meshing positions of the claws 22b and 24b are changed.

Though it is desirable to design and manufacture the upper and lower metal mold so as to have discrete total height values having a difference equal to a pitch P of the claws indicated in FIG. 3 in order that always the claws 22b and the claws 24b can mesh with each other, if the total height should have any arbitrary value, then it is only necessary that the upper ring 12 is rotated after the lower ring 4 has been raised up to an appropriate level by somewhat shortening the hydraulic cylinders 3 according to an instruction issued from a known height detector not shown.

In the above-described manner, according to the second preferred embodiment, metal molds having a different total height of upper and lower metal molds can be used.

Since many changes and modifications in design can be made to the above-described construction without departing from the spirit of the present invention, it is intended that all matter contained in the above description and illustrated in the accompanying drawings shall be interpreted to be illustrative and not as a limitation to the scope of the invention.

What is claimed is:

1. A tire vulcanizing machine comprising a lower metal mold supported on a base, an upper metal mold supported from a bolster and adapted to be placed on said lower metal mold, an upper ring rotatably fitted around an outer circumferential portion of said bolster and having claws at its lower end, a lower ring supported from said base in a vertically movable manner and having claws at its upper end, first drive means for rotating said upper ring, and second drive means for vertically moving said lower ring, the claws of said upper ring and the claws of said lower ring being adapted to be engaged with or disengaged from each other as a result of rotation of said upper ring, and said upper and lower metal molds being pressurized by lowering said lower ring when the claws of said upper ring and the claws of said lower ring are engaged with each other.

2. A tire vulcanizing machine comprising a lower metal mold supported on a base, an upper metal mold supported from a bolster and adapted to be placed on said lower metal mold, an upper ring rotatably fitted around an outer circumferential portion of said bolster and having claws at its lower end, a lower ring supported from said base in a vertically movable manner and having claws at its upper end, first drive means for rotating said upper ring, and second drive means for vertically moving said lower ring, the claws of said upper ring and the claws of said lower ring being adapted to be engaged with or disengaged from each other as a result of rotation of said upper ring, and said upper and lower metal molds being pressurized by lowering said lower ring when the claws of said upper ring and the claws of said lower ring are engaged with each other, wherein at least one of the claws of said upper ring and the claws of said lower ring are formed at multiple levels so that the engaging position between said upper and lower rings can be adjusted in correspondence to a total height of said upper and lower metal molds.

* * * * *